US012508597B2

(12) United States Patent
Schuerman et al.

(10) Patent No.: US 12,508,597 B2
(45) Date of Patent: Dec. 30, 2025

(54) SPUR WHEEL SCRAPER

(71) Applicant: Metso Outotec USA Inc., Waukesha, WI (US)

(72) Inventors: Brandon John Schuerman, York, PA (US); Wayne Eugene Myers, Mesa, AZ (US); Steven E. Richardson, Gilbert, AZ (US)

(73) Assignee: METSO USA INC., Brookfield, WI (US)

( * ) Notice: Subject to any disclaimer, the term of this patent is extended or adjusted under 35 U.S.C. 154(b) by 180 days.

(21) Appl. No.: 17/197,346

(22) Filed: Mar. 10, 2021

(65) Prior Publication Data

US 2022/0288598 A1 Sep. 15, 2022

(51) Int. Cl.

| | |
|---|---|
| ***B02C 4/40*** | (2006.01) |
| ***B02C 4/02*** | (2006.01) |
| ***B02C 4/28*** | (2006.01) |
| ***B02C 4/30*** | (2006.01) |

(52) U.S. Cl.

CPC .................. *B02C 4/40* (2013.01); *B02C 4/02* (2013.01); *B02C 4/283* (2013.01); *B02C 4/30* (2013.01); *B02C 4/305* (2013.01)

(58) Field of Classification Search

CPC .. B02C 4/30; B02C 4/305; B02C 4/40; B02C 4/02; B02C 4/283

USPC ........................................................... 241/30

See application file for complete search history.

(56) References Cited

U.S. PATENT DOCUMENTS

| | | | |
|---|---|---|---|
| 1,072,195 | A | 9/1913 | Townsend |
| 1,092,026 | A | 3/1914 | Dailey |
| 1,204,450 | A | 11/1916 | Joseph |
| 1,618,942 | A | 2/1927 | Brien et al. |
| 1,963,781 | A | 6/1934 | Evans |
| 2,111,535 | A | 3/1938 | Miller |
| 2,124,008 | A | 7/1938 | Roth |
| 2,560,837 | A | 7/1951 | Alciati |
| 2,969,193 | A | 1/1961 | Ball |
| 2,991,019 | A | 7/1961 | Sugden |

(Continued)

FOREIGN PATENT DOCUMENTS

| | | | |
|---|---|---|---|
| AU | 2018264756 | B2 | 9/2021 |
| CL | 69077 | | 8/2022 |

(Continued)

OTHER PUBLICATIONS

CN 106540776 Wang (Mar. 29, 2017) MT (Year: 2017).*

(Continued)

*Primary Examiner* — Adam J Eiseman
*Assistant Examiner* — Fred C Hammers
(74) *Attorney, Agent, or Firm* — Andrus Intellectual Property Law, LLP

(57) ABSTRACT

The disclosure relates to a roller crusher including a first grinding roll and a second grinding roll, the first and second grinding rolls being arranged generally in parallel to each other and to define a crushing gap therebetween and drivable in a counter-rotating manner. The roller crusher includes a device of a first type for loosening granular material present on a crushing surface of at least one of the rolls, the device including at least one rotatable disc element. The subject further relates to a roller crusher, wherein the plurality of disc elements is individually rotatable.

18 Claims, 5 Drawing Sheets

(56) References Cited

U.S. PATENT DOCUMENTS

| | | | | | |
|---|---|---|---|---|---|
| 3,255,285 | A | | 6/1966 | Chilson | |
| 4,134,673 | A | | 1/1979 | Fisher | |
| 4,173,177 | A | | 11/1979 | Davis | |
| 4,357,287 | A | | 11/1982 | Schonert | |
| 4,434,522 | A | | 3/1984 | Linzberger | |
| 4,906,335 | A | | 3/1990 | Goodnow et al. | |
| 5,054,701 | A | * | 10/1991 | Durinck | B02C 4/30 241/226 |
| 5,257,510 | A | | 11/1993 | Cox | |
| 5,408,720 | A | | 4/1995 | Miles | |
| 5,980,692 | A | | 11/1999 | Goodnow | |
| 9,033,270 | B2 | | 5/2015 | Vantrease | |
| 11,618,034 | B2 | | 4/2023 | Mark | |
| 2012/0199402 | A1 | | 8/2012 | Rupp | |
| 2013/0175379 | A1 | | 7/2013 | Vantrease | |
| 2015/0251222 | A1 | | 9/2015 | Walling | |
| 2023/0126189 | A1 | | 4/2023 | Reznitchenko et al. | |

FOREIGN PATENT DOCUMENTS

| | | | | | |
|---|---|---|---|---|---|
| CL | 69078 | | | 8/2022 | |
| CN | 203281336 | U | | 11/2013 | |
| CN | 104607268 | | * | 5/2015 | |
| CN | 106540776 | | * | 3/2017 | |
| CN | 106733110 | | * | 5/2017 | |
| CN | 106975535 | A | | 7/2017 | |
| CN | 108126786 | A | | 6/2018 | |
| CN | 106179585 | B | | 8/2018 | |
| CN | 108855346 | A | | 11/2018 | |
| CN | 109046576 | A | | 12/2018 | |
| CN | 109174284 | | * | 1/2019 | |
| CN | 106881169 | B | | 8/2019 | |
| CN | 210304685 | U | | 4/2020 | |
| CN | 113976221 | A | | 1/2022 | |
| CN | 217140526 | U | | 8/2022 | |
| CN | 217341537 | U | | 9/2022 | |
| CN | 115254297 | A | | 11/2022 | |
| CN | 217856344 | U | | 11/2022 | |
| CN | 218459658 | U | | 2/2023 | |
| CN | 116889903 | A | | 10/2023 | |
| CN | 117654693 | A | | 3/2024 | |
| DE | 102014104038 | A1 | | 9/2015 | |
| DE | 102017208014 | A1 | | 11/2018 | |
| DE | 102019209514 | A1 | | 12/2020 | |
| EP | 2653229 | A1 | * | 10/2013 | B02C 4/02 |
| EP | 3572153 | A1 | | 11/2019 | |
| JP | 3379672 | B2 | | 2/2003 | |
| WO | 2018206200 | A1 | | 11/2018 | |
| WO | 2020226651 | A1 | | 11/2020 | |
| WO | 2020226653 | A1 | | 11/2020 | |
| WO | 2020260307 | A1 | | 12/2020 | |

OTHER PUBLICATIONS

CN 106733110 Wang (May 31, 2017) MT (Year: 2017).*
CN 104607268 Huang (May 13, 2015) MT (Year: 2015).*
Wire wheel (from 2017) (https://www.amazon.com/dp/B08KDFHSVS, website accessed Feb. 16, 2023) (Year: 2017).*
CN 109174284 Huang (Jan. 11, 2019) MT (Year: 2019).*
EP-2653229-A1 MT (Year: 2013).*
International Search Report and Written Opinion for PCT/US2022/049185, mailed Mar. 21, 2023.
International Search Report and Written Opinion for International Application No. PCT/US2023/072881, dated Jan. 9, 2024.
Office Action for U.S. Appl. No. 17/546,215, dated Aug. 31, 2023.
International Search Report & Written Opinion for International Application No. PCT/US2024/028297, mailed Jun. 26, 2024.
International Search Report & Written Opinion for International Application No. PCT/US2024/028301, mailed Jun. 26, 2024.
Office Action and Search Report for Chinese Patent Application No. 202210233929.3, issued Sep. 30, 2024.
Office Action for U.S. Appl. No. 17/940,139, dated Aug. 1, 2024.
Office Action for U.S. Appl. No. 18/330,532, dated May 6, 2025.
International Search Report and Written Opinion for International Application No. PCT/US2022/019686 mailed Jul. 14, 2022.
Office action for Chinese Utility Model Application No. 2024213052592, mailed Apr. 10, 2025.
Office Action for U.S. Appl. No. 17/940,139, mailed Jul. 8, 2025.
Office Action for U.S. Appl. No. 18/330,529, mailed Jun. 4, 2025.
Search Report and Examiner's Report for Chilean Patent Application No. 202401590, dated Sep. 24, 2025.

* cited by examiner

SPUR WHEEL SCRAPER

FIELD OF THE DISCLOSURE

The present disclosure relates to a roller crusher having a device for loosening grinding material and a method thereof.

BACKGROUND ART

When comminuting or crushing materials, such as rock, ore, cement clinker or other hard materials, the use of roller crushers or the like is well known in the art. Preferably, two grinding rolls are arranged generally parallel and configured to rotate in opposite directions, towards each other, wherein the two grinding rolls are separated by a gap and the material to be comminuted is fed by gravity or choke-fed into the gap. One type of such grinding assembly is called high pressure grinding rollers or high pressure roller crusher. This type of grinding assembly uses a crushing technique called inter-particle crushing. Here, the material to be comminuted or crushed is crushed not only by the crushing surface of the rolls, but also by the particles in the material to be comminuted or crushed themselves, hence the name interparticle crushing. When crushing material using roller crushers, the material to be crushed may form a material build-up on a crushing surface of the grinding rolls, protecting the surface from wear and tear.

However, if the material build-up becomes too great, especially if the material build-up is greater than the gap size between the two grinding rolls, problems during operation of the roller crusher may occur, e.g. that the build-up of the two rolls come in contact with each other.

A further problem, at least if one, or both, of the two grinding rolls are equipped with one or more flanges, is that material build-up may be formed between the crushing surface of the grinding roll and the flange. Here, the problem may occur during shutdown or start up procedure of the roller crusher, when there may be no material between the grinding rolls, and all crushing force between the grinding rolls may be applied on the build-up area on the flanges. This may lead to excessive local load and high stresses on edge block segment of the grinding roll and the flange. Further, it may also create skewing and high stresses on a frame structure of the roller crusher.

In an attempt to meet this problem, it is known to use scrapers for removing the material build-up from the surface.

Such scrapers comprise a non-flexible device for removing the material build-up from the surface. Further, such scrapers are sometimes installed inclined towards the crushing surface which may cause the scraper to be exposed to excessive shear stresses during operation.

Thus, the conventional grinding rolls arranged with scrapers are arranged with several drawbacks. There is thus a need in the art for an improved solution having a more flexible device which may be arranged to remove the material build-up in an efficient and user-friendly way.

SUMMARY

An object of the disclosure is to provide for a roller crusher having a device arranged for loosening granular material present on a crushing surface in an efficient and user-friendly way.

Another object of the disclosure is to increase lifetime of the roller crusher, and especially the lifetime of the device provided for loosening the granular material present on the crushing surface.

Another object of the disclosure is to provide for a more flexible device provided for loosening material build-up on the crushing surfaces of the grinding rolls of the roller crusher.

According to a first aspect of the invention, these and other objects are achieved, in full or at least in part, by a roller crusher comprising a first grinding roll and a second grinding roll, said first and second grinding rolls being arranged generally in parallel to each other and to define a crushing gap therebetween and driveable in a counter-rotating manner, wherein the roller crusher comprises a device of a first type for loosening granular material present on a crushing surface of at least one of the rolls, the device comprising at least one rotatable disc element.

By the term "loosening granular material" is here meant that the material is loosened up in relation to the crushing surface but not necessarily immediately removed from the crushing surface during the loosening.

The material present on the crushing surface may be material build-up that may occur during operation of the roller crusher. The disclosed roller crusher may be advantageous as it allows for the material to be loosened up by the device comprised in the roller crusher. The rotatable disc or discs will come in contact with material present on the surface of the roll, possibly cutting into the material such that it becomes loosened. The material may come off immediately or at a later point during rotation of the roll. By loosening the material up, it is possible to avoid that too much material is present on the crushing surface and thereby ensuring that the roller crusher may be operated in an efficient way. The device may be arranged to face said at least one roll adjacent to the crushing surface of the roll. Thereby, the device is capable to loosen the material present on the crushing surface in an efficient way. The device may be able to loosen the material when the material build-up may have reached a predefined thickness such that the device may come in contact with the material build-up.

The roller crusher is advantageous as the at least one rotatable disc element comprised in the device causes shear stress in the material provided on the surface of the roll, thereby creating a loosening thereof. Also, the device having at least one rotatable disc may reduce the load induced during loosening in comparison with a rigid scraper as defined in the prior art. This due to the fact that the at least one disc element is free to rotate as it comes in contact with the material.

The roller crusher may be further advantageous in that the lifetime of the device may be improved. Thus, since if the device comprises a plurality of disc elements, each disc element may be replaceable independently of the other disc elements. Thus, instead of being forced to replace the whole device when worn out, only the specific element that is worn out may be replaced. Also, since the at least one disc element is rotatable, they may be exposed to reduced loads in comparison with rigid scrapers.

According to one embodiment, the device comprises a plurality of rotatable disc elements.

According to one embodiment, the plurality of rotatable disc elements may be made of metal, such as steel.

According to one embodiment, one or more flanges may be attached to at least one of a first and a second end of at least one of the two grinding rolls. The flange may be advantageous as it provides for that, when feeding the material into the gap, the material may be kept between the grinding roll(s) as well as to direct the material into the gap between the grinding rolls.

The device of the roller crusher may be further advantageous when the roller crusher may have the one or more flanges because the device may be arranged to loosen the material that may be present between the surface and the flange, i.e. at or near the corner created by the flange and the outer surface of the roll, in a user-friendly and efficient way. Thus, it may protect the flange from intensive wear. Thereby, by being able to loosen the material in a user-friendly and efficient way, the wear and tear on the flange may be reduced. Thus, an improved lifetime of the flange(s) may be achieved by the disclosed roller crusher having the device for loosening the material.

The device may be used during shutdown or start up procedures on the roller crusher. This may be advantageous as it may provide for reduced local loads and stresses on edge block segment of the surface and the flange. In addition, it may provide for reduced skewing and stress on frame structure of the roller crusher.

Hence, the roller crusher comprising the device is advantageous over prior art in that it allows for a device arranged to loosen the material present on the crushing surface. The roller crusher comprising the device is further advantageous over the prior art in that it allows for a flexible device arranged to loosen the material on the surface in an efficient and user-friendly way. Further, the lifetime of the device may be improved compared to the prior art solution as well.

According to an embodiment, the plurality of disc elements is individually rotatable.

An advantage with this embodiment is that each of the plurality of disc elements may come in contact with the crushing surface in different ways, e.g. at different angles. This may be advantageous if the material build-up may have different forms at different positions such that the material may be loosened in different ways on the different positions.

According to an embodiment, the plurality of disc elements comprises circumferential protrusions.

An advantage with this embodiment is that the loosening of the material may be performed in a more efficient way when the disc element comprises the protrusions which are arranged to penetrate the material present on the roll as it builds up.

According to an embodiment, a cross-section of the circumferential protrusions may increase from a tip of the protrusion towards a center of the disc.

An advantage with this embodiment is that the loosening of the material may be performed in a more efficient way when the protrusions displace more material with increasing penetration depth into the material.

According to an embodiment, the circumferential protrusions comprise at least one spur.

An advantage with this embodiment may be that the loosening of the material may be provided in a more efficient way. Thus, the protrusions may provide for that the device may be able to penetrate the material and thereby loosening the material in an efficient way.

According to an embodiment, the plurality of spurs comprises 4-25 spurs. Preferably plurality of spurs comprises 6-20 spurs. However, it should be noted that the plurality of spurs may comprise less than four spurs and more than 25 as well.

An advantage with this embodiment may be that it may be possible to design the device in different ways, e.g. depending on the size of the roller crusher and/or the grinding rolls as well as the type of material that is comminuted using the roller crusher. Thus, a more flexible device for the roller crusher is achieved.

According to an embodiment, the plurality of spurs is arranged on a central hub portion.

An advantage with this embodiment is that each of the plurality of spurs being able to rotate in an easy and smooth way while being arranged on the central hub portion. In addition, the central hub portion provides for that the spurs are kept in place in relation to the surface of the at least one grinding roll but also in relation to the other spurs.

According to an embodiment, the plurality of disc elements each have a thickness between 3-50 mm, more preferably 3-30 mm, more preferably 4-20 mm, and even more preferably 4-15 mm.

According to an embodiment, the plurality of spurs each has a length between 25-150 mm, more preferably 50-100 mm.

An advantage with this embodiment may be to increase the flexibility of loosening the material present on the crushing surface. Thus, the design of the spurs may be based on the material to be comminution or the roller crusher to be used.

According to an embodiment, the roller crusher comprises more than one device of the first type for loosening granular material.

An advantage with this embodiment may be to increase continuous nonstop operation as well as to achieve an efficient loosening operation, wherein the material may be partially loosening in a stepwise approach. By being able to partially loosen the material on the surface may provide for decreased impact force on the device as well as increasing the lifetime of the device during operation. This may also provide that loosening of the material may be performed in a more controllable manner because of the stepwise approach. The plurality of devices may be arranged at different distances from the grinding roll.

According to an embodiment, the roller crusher comprises a device of a second type for removing the granular material, said device of the second type is arranged downstream the device of the first type.

An advantage with this embodiment may be that it allows for a more efficient way of loosening but also removing the material on the crushing surface. Thus, the device of the first type may be applied for loosening the material and the device of the second type may be applied for removing the material, arranged downstream the device of the first type. This provides for a stepwise removement of the material on the surface. This may provide for that the removement of the material may be performed in a more controllable manner because of the stepwise approach.

According to an embodiment, the device of the second type comprises a scraper.

According to a second aspect, there is provided a method for loosening granular material present on a crushing surface of at least one roll of a roller crusher, said roller crusher comprising a first grinding roll and a second grinding roll, said first and second grinding rolls being arranged generally in parallel to each other and to define a crushing gap therebetween and drivable in a counter-rotating manner, said method comprising the following step

- providing a device of a first type on the roller crusher, said device comprising a plurality of rotatable disc elements, said plurality of rotatable disc elements being arranged to face said at least one roll and adjacent to the crushing surface of the roll such that, when build-up of granular material on the crushing surface of the roll reaches a predefined thickness, at least one rotatable disc element come in contact with the granular material.

According to an embodiment, said method further comprises penetrating the granular material with the at least one rotatable disc element.

According to an embodiment, said method further comprises loosening the granular material with the at least one rotatable disc element.

According to an embodiment, said method further comprising providing a device of a second type on the roller crusher, said device of the second type comprises a scraper and is arranged downstream the device of the first type, and removing the loosened granular material using the device of the second type.

According to a third aspect, there is provided a refitting kit for a roller crusher having a first grinding roll and a second grinding roll. The first and second grinding rolls being arranged generally in parallel to each other and defining a crushing gap therebetween and are drivable in a counter-rotating manner. The refitting kit comprises a device of a first type for loosening granular material present on a crushing surface of at least one of the rolls, the device comprising at least one rotatable disc element.

Effects and features of the second and third aspects are largely analogous to those described above in connection with the first aspect. Embodiments mentioned in relation to the first aspect are largely compatible with the second and the third aspects. It is further noted that the inventive concepts relate to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The disclosure will by way of example be described in more detail with reference to the appended [schematic] drawings, which show presently preferred embodiments of the disclosure.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

Figure 1:
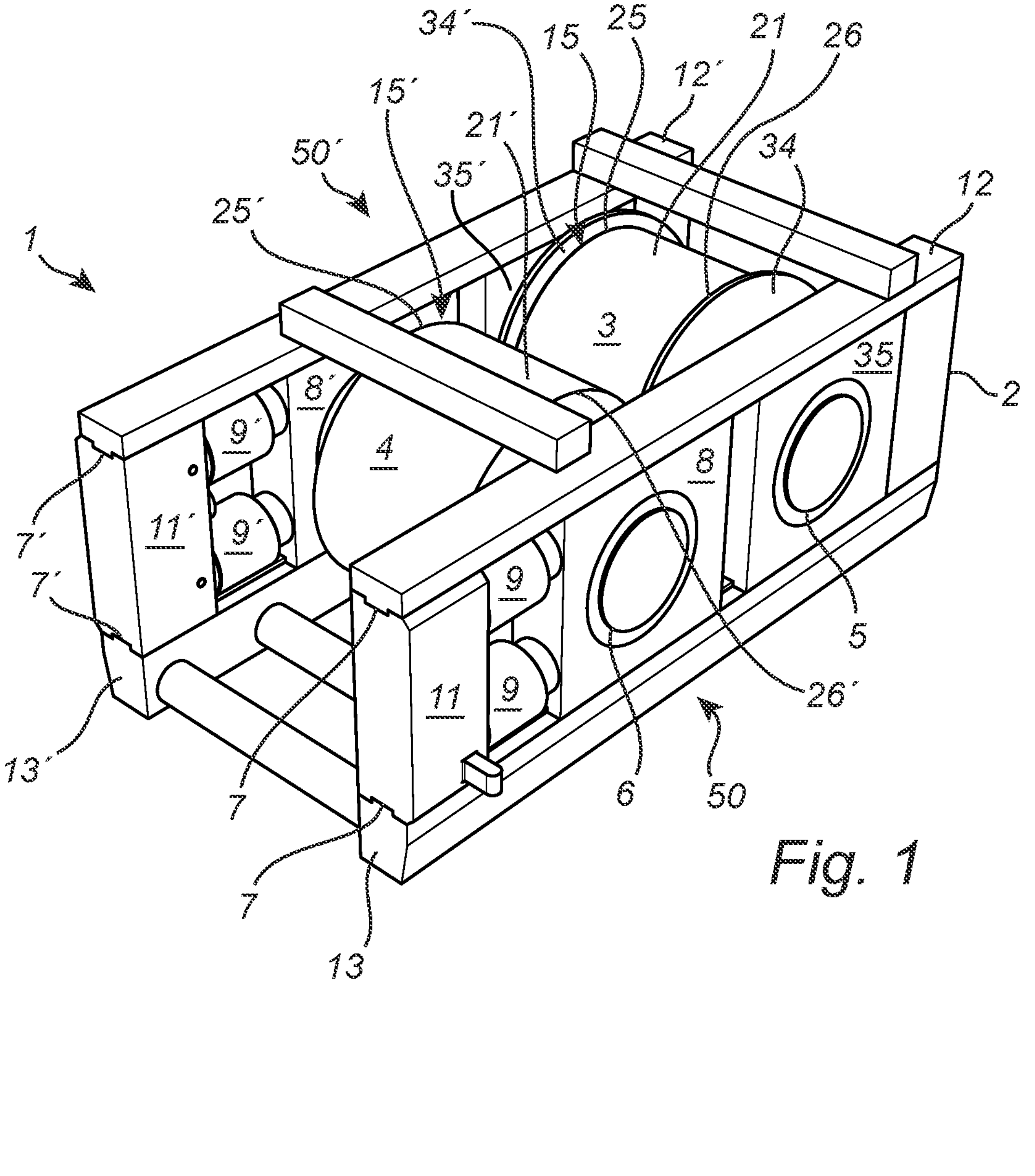
FIG. 1 shows a perspective view of a roller crusher according to prior art.

FIG. 1 shows a roller crusher 1 for comminution of materials according to the prior art. Such roller crusher 1 comprises a frame 2 in which a first grinding roll 3 and a second grinding roll 4 is arranged. The first and second grinding rolls 3, 4 are arranged generally in parallel to each other and to define a crushing gap therebetween. The grinding rolls 3, 4 are drivable in a counter-rotating manner. Each of the grinding rolls 3, 4 comprises a roll body 21, 21'. The roll body 21, 21' has a crushing surface 15, 15', which is a cylindrical outer surface of the roll body 21, 21', and a cylindrical inner surface. The crushing surface 15, 15' extend axially between a first end 25, 25' and a second end 26, 26' of the roll body 21, 21'.

The first grinding roll 3 is arranged in first bearings 5, 5'. The first bearing housings 35, 35' of these first bearings 5, 5' are fixedly attached to the frame 50 and are thus immovable. The second grinding roll 4 is arranged in second bearings 6, 6' which are arranged in the frame 2 in a slidable movable manner. The second bearings 6, 6' may move in the frame 2 in a direction perpendicular to a longitudinal direction of the first and second grinding rolls 3, 4. Typically, a guiding structure 7, 7' is arranged in the frame 2 on first and second sides 50, 50' along upper and lower longitudinal frame elements 12, 12', 13, 13' of the roller crusher 1. The second bearings 6, 6' are arranged in second bearing housings 8, 8' which are movable and may slide along the guiding structure 7, 7'. Further, a number of hydraulic cylinders 9, 9' are arranged between the second bearing housing 8, 8' and first and second end supports 11, 11' which are arranged near or at a first end of the roller crusher 1. These end supports 11, 11' attach the upper and lower longitudinal frame elements 12, 12', 13, 13' and also act as support for these forces occurring at the hydraulic cylinders 9, 9' as they are adjusting the gap width and reacting to forces occurring at the grinding rolls 3, 4 due to material fed to the roller crusher 1. Such roller crushers 1 work according to the earlier disclosed crushing technique called interparticle crushing, and the gap between the crushing rolls 3, 4 is adjusted by the interaction of feed load and the hydraulic system effecting the position of the second grinding roll 4.

As further illustrated in FIG. 1, the first grinding roll 3 has a flange 34, 34' attached to a first end 25 and a second end 26 of the roll body 21. The flanges 34, 34' extend in a radial direction of the roll 3 and has a height above the crushing surface 15 of the roll 3.

In an alternative embodiment, the flanges 34, 34' are arranged on the second grinding roll 4, instead of on the first grinding roll 3.

Figure 2A:
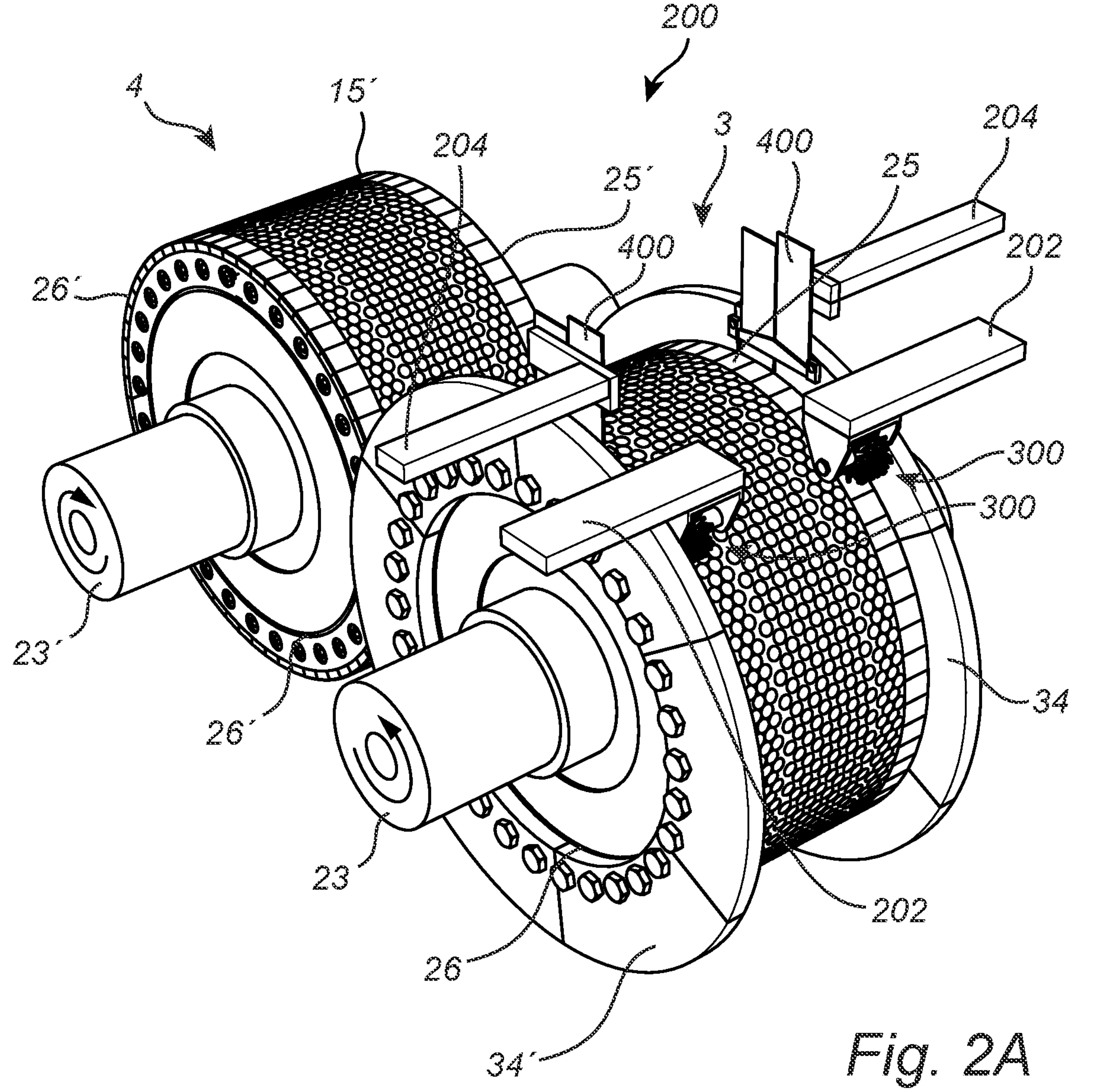
FIG. 2A is an isomeric view of a roller crusher including a first grinding roll constructed in accordance with an embodiment of the present disclosure, and a second grinding roll.
Figure 2B:
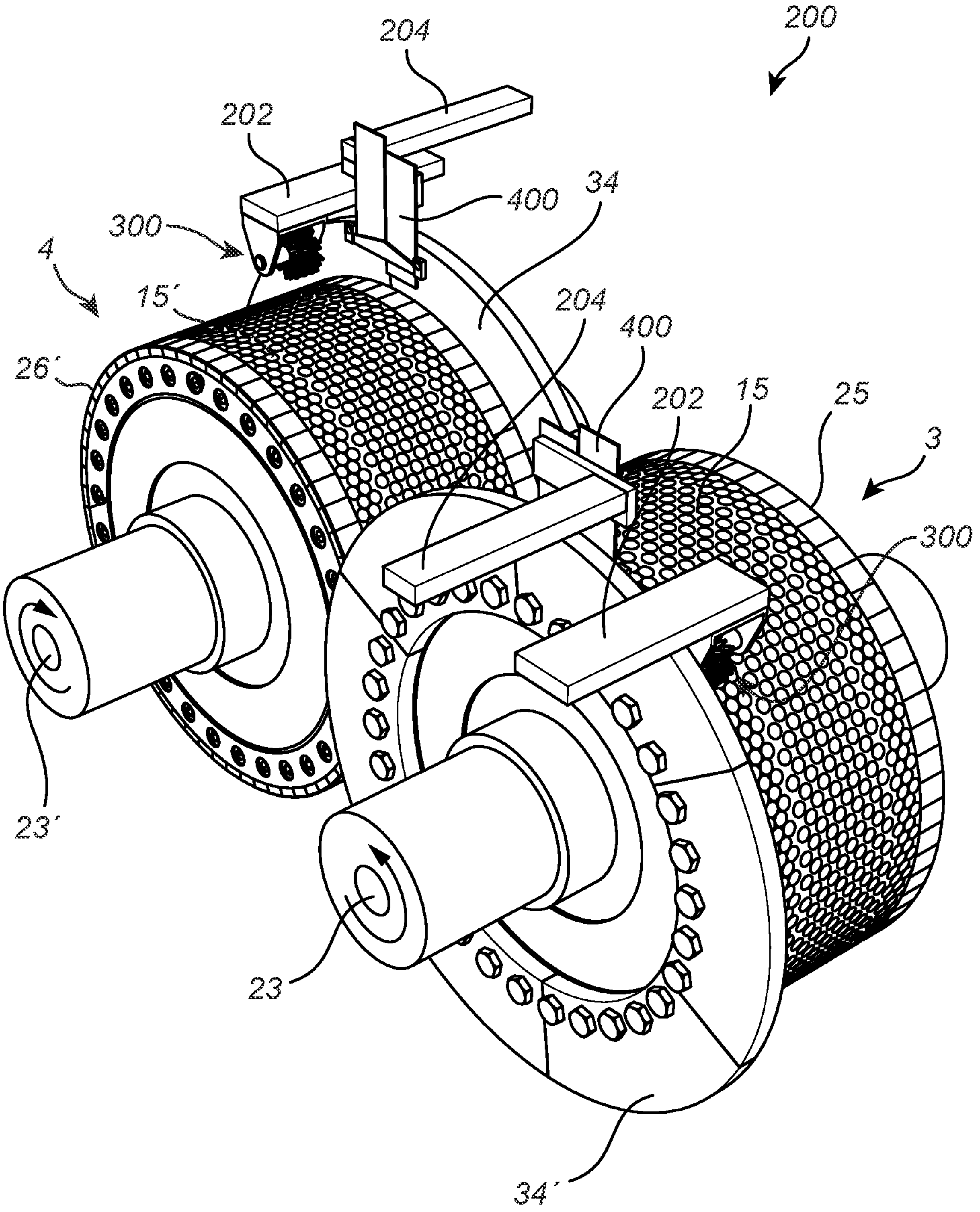
FIG. 2B is an isomeric view of a roller crusher including two grinding rolls constructed in accordance with an embodiment of the present disclosure.

In an alternative embodiment, and as further illustrated in FIG. 2B, one of the flanges 34 is arranged on the first grinding roll 3 and the other one of the flanges 34' is arranged on the second grinding roll 4.

FIGS. 2A-B illustrate different arrangements of the grinding rolls 3, 4 by way of example. FIG. 2A is in line with the arrangement of FIG. 1, wherein the flanges 34, 34' are arranged on the first and second ends 25, 26 of the first grinding roll 3. FIG. 2B illustrates the alternative embodiment, wherein one of the flanges 34' is arranged on the second end 26 of the first grinding roll 3 and the other one of the flanges 34 is arranged on the first end 25' of the second grinding roll 4. It should be noted, although not illustrated, that the grinding rolls 3, 4 may be arranged without any flanges 34, 34' as well.

In addition to what have been discussed in connection with FIG. 1, the first and second grinding rolls 3, 4 are each respectively rotatable about a shaft 23, 23' in opposite directions, towards each other. The roll body 21, 21' of respective grinding roll 3, 4 extends along and is rotatable about a longitudinal axis that passes through the center of the shaft 23, 23'. Preferably, the inner surface of the roll body 21, 21' receives and engages the shaft 23, 23' that imparts rotation to the grinding roll 3, 4. The two generally parallel grinding rolls 3, 4 are separated by the gap.

The material to be comminuted by the roller crusher 1 may, during operation, create a material build-up, also called autogenous layer, on the crushing surfaces 15, 15' of the two grinding rolls 15, 15'. The material to be comminuted by the roller crusher 1 may also, during operation, create a material build-up between the crushing surface 15, 15' and the flange 34, 34'. The roller crusher 1 further comprises a device of a first type 300 arranged for loosening the granular material present on the crushing surface 15, 15' of at least one of the rolls 3, 4. The device 300 is arranged for loosening the material present between the crushing surface 15, 15' and the flange 34, 34'.

The device 300 may be attached to fastening means 202 by means of a fastening device 308. The fastening means 202 may be attached to the roller crusher 1, e.g. to the frame 2 of the roller crusher 1 in the figures, the device is attached to an upper part of the frame 2. It is, however, possible to arrange the device at a lower part of the frame 2. The device 300 may be arranged upstream or downstream the crushing gap arranged between the two grinding rolls 3, 4.

The device 300 comprises at least one rotatable disc element 302. As illustrated in further detail in FIGS. 3A-C, the device 300 comprises a plurality of rotatable disc elements 302. The plurality of rotatable disc elements 302 is arranged to face one of the two grinding rolls 3, 4. The disc elements 302 may be adjacent to the crushing surface 15, 15' of the grinding roll 3, 4. Thereby, when build-up of granular material on the crushing surface 15, 15' of the grinding roll 3, 4 reaches a predefined thickness, at least one rotatable disc element 302 will come in contact with the granular material. Thus, the disc elements 302 are arranged to loosen the granular material on the crushing surface 15, 15'. The device 300 penetrates and displaces the granular material on the crushing surface 15, 15' thereby loosening the material. According to one embodiment, the device 300 may be arranged to loosen the material during operation of the roller crusher 1. According to one embodiment, the device 300 may be arranged to loosen the material during shutdown or startup of the roller crusher 1. It should be noted that the device 300 may be arranged to loosen the material during both operation and shutdown or startup of the roller crusher 1.

The roller crusher 1 further comprise a device of a second type 400 The device of the second type 400 may be arranged for removing the loosened material present on the crushing surface 15, 15' such as in the transition between the crushing surface 15, 15' and the flange 34, 34'. The device of the second type 400 may be arranged downstream the device of the first type 300. The device of the second type 400 may be a scraper. The device of the first type 300 may be loosening the material on the crushing surface 15, 15' and the device of the second type 400 may be removing the loosened material on the crushing surface 15, 15'. The device of the second type 400 may be attached to fastening means 204. The fastening means 204 may be attached to the roller crusher 1, e.g. to the frame 2 of the roller crusher 1.

As illustrated in FIG. 2A, two devices of the first type 300 are arranged opposite each other, on each side of the grinding roll 3. Two devices of the second type 400 are arranged opposite each other, on each side of the grinding roll 3. However, it should be noted that, if more than one device of the same type is comprised in the roller crusher 1, the more than one device of the same type may be arranged independently of the other devices of the same type. Hence, the devices of the same type may not have to be arranged opposite each other.

Figure 3A:
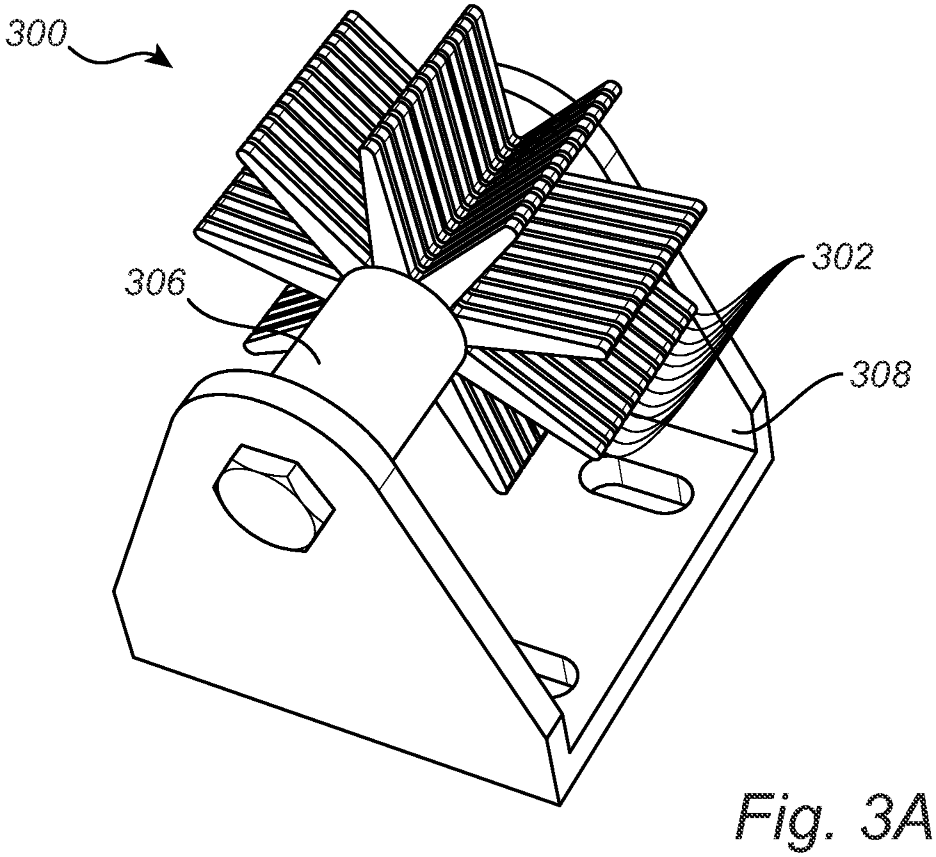
FIG. 3A illustrates a device in accordance with an embodiment of the present disclosure.
Figure 3B:
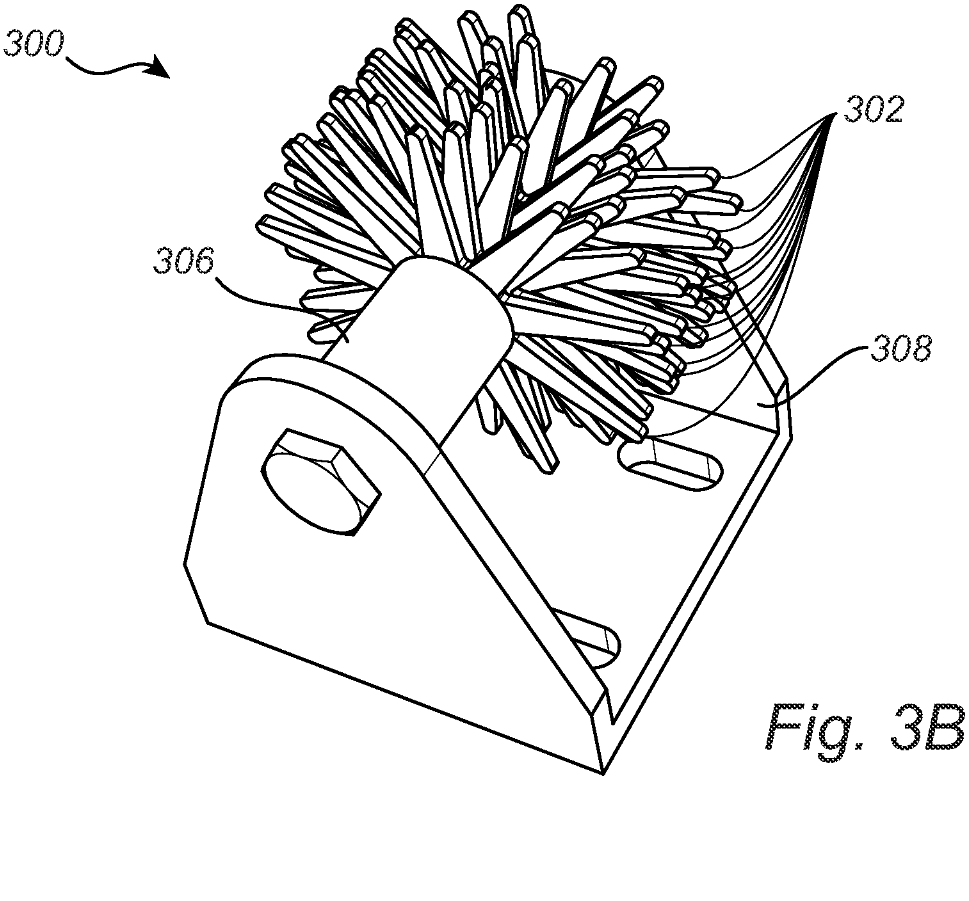
FIG. 3B illustrates a device in accordance with an embodiment of the present disclosure.
Figure 3C:
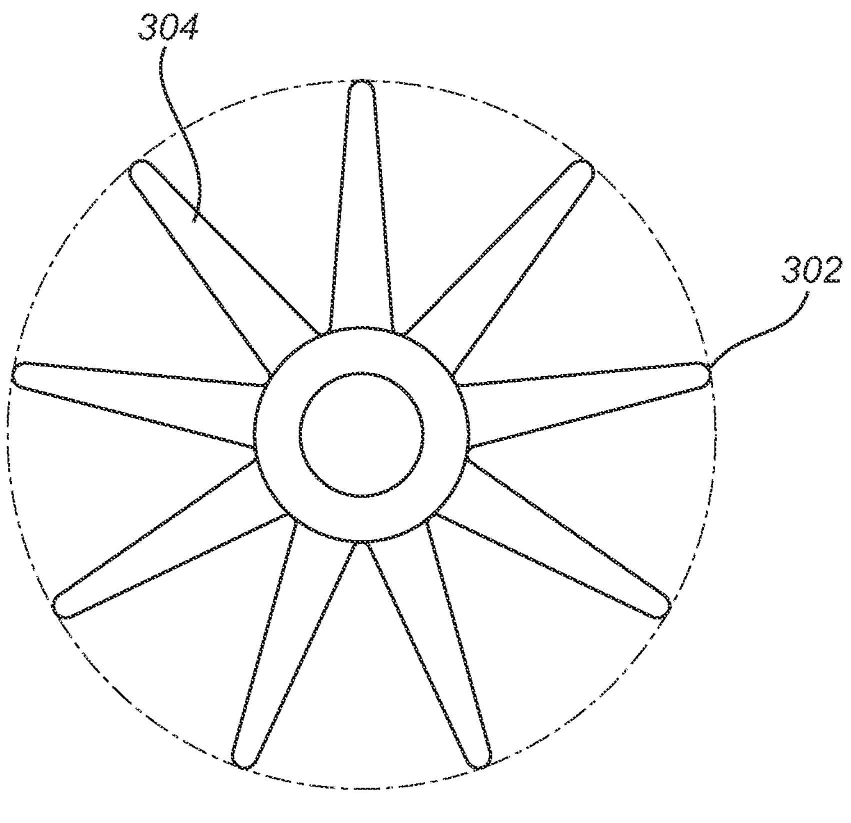
FIG. 3C illustrates a side view of a disc element comprised in a device in accordance with an embodiment of the present disclosure.

With reference to FIGS. 3A-C, the device of the first type 300 is illustrated in more detail. The device of the first type 300 comprises the plurality of rotatable disc elements 302. The plurality of disc elements 302 are individually rotatable. By having the plurality of disc elements 302 individually rotatable, one or more of the disc elements 302 may come in contact with the material on the crushing surface 15, 15'. The plurality of disc elements 302 may each have a thickness between 3-50 mm, more preferably 3-30 mm, or more preferably 4-20 mm and even more preferably 4-15 mm.

The plurality of disc elements comprises circumferential protrusions. The circumferential protrusions comprise at least one spur 304. As illustrated in the figures, the circumferential protrusions comprise a plurality of spurs 304. The plurality of spurs 304 may each have a length between 25-150 mm, more preferably 50-100 mm. This may be advantageous as one or more of the spurs 304 may come in contact with the material on the crushing surface 15, 15' but necessarily not all of the spurs 304.

The plurality of spurs comprises 4-25 spurs. Thus, it may be possible to design the device 300 with the spurs 304 in different ways based on e.g. the roller crusher 1 or the material to be comminuted. It should be noted that these are only examples and the design of the device 300 may be based on other parameters as well.

The plurality of spurs 304 is arranged on a central hub portion 306. The central hub portion 306 is attached to the fastening device 308 by means of a bolt. The fastening device 308 is for attaching the device 300 to the roller crusher 1. The fastening device 308 may be attached to the fastening means 202 as illustrated in FIGS. 2A-B. The fastening device 308 may be attached to the roller crusher 1 by using other types of fastening or attaching means as well. It should further be noted that the device 300 may be attached to the roller crusher 1 by using other types of fastening or attaching devices as well.

The person skilled in the art realizes that the present disclosure by no means is limited to the preferred embodiments described above. On the contrary, many modifications and variations are possible within the scope of the appended claims.

For example, the device of the first type may be of any suitable size and shape depending on the material to be comminution and on the type of roller crusher that is used. The number of devices comprises in the roller crusher may also depend on the material to be comminuted and on the type of roller crusher that is used.

Additionally, variations to the disclosed embodiments can be understood and effected by the skilled person in practicing the claimed disclosure, from a study of the drawings, the disclosure, and the appended claims.

The invention claimed is:

1. A roller crusher comprising a first grinding roll and a second grinding roll, said first and second grinding rolls being arranged in parallel to each other and to define a crushing gap therebetween and drivable in a counter-rotating manner, wherein the roller crusher comprises a device of a first type arranged to loosen granular material present between a crushing surface and a flange attached to at least one of the first and the second end of at least one of the two grinding rolls, wherein the device comprises at least one rotatable disc element spaced from and adjacent to the crushing surface and positioned to contact only the granular material present on the grinding roll between the crushing surface and the flange such that the at least one rotatable disc element maintains a predetermined thickness of the granular material on the crushing surface of the grinding roll.

2. The roller crusher according to claim 1, wherein the device of the first type comprises a plurality of rotatable disc elements.

3. The roller crusher according to claim 2, wherein the rotatable disc elements of the plurality of rotatable disc elements are individually rotatable.

4. The roller crusher according to claim 1, wherein the at least one rotatable disc element comprises at least one circumferential protrusion.

5. The roller crusher according to claim 4, wherein the at least one circumferential protrusion comprises at least one spur.

6. The roller crusher according to claim 5, wherein the at least one spur comprises 4 to 25 spurs.

7. The roller crusher according to claim 5, wherein the at least one spur is arranged on a central hub portion.

8. The roller crusher according to claim 1, wherein the at least one rotatable disc element each has a thickness between 4-50 mm.

9. The roller crusher according to claim 5, wherein the at least one spur each has a length between 25-150 mm.

10. The roller crusher according to claim 1, wherein the roller crusher comprises more than one device of the first type for loosening granular material.

11. The roller crusher according to claim 1, wherein the roller crusher comprises a device of a second type for removing the granular material, said device of the second type being arranged downstream of the device of the first type.

12. The roller crusher according to claim 11, wherein the device of the second type comprises a scraper.

13. A method for loosening granular material present between a crushing surface and a flange of at least one roll of a roller crusher, said roller crusher comprising a first grinding roll and a second grinding roll, said first and second grinding rolls each presenting a respective crushing surface and being arranged in parallel to each other to define a crushing gap therebetween and drivable in a counter-rotating manner, wherein a flange is attached to one of a first and a second end of at least one of the two grinding rolls, said method comprising the following step providing a device of a first type on the roller crusher, said device comprising the least one rotatable disc element, said at least one rotatable disc element being arranged to face said at least one roll and being adjacent to the crushing surface and the flange of the roll such that, when build-up of granular material between the crushing surface and the flange of the roll reaches a predefined thickness, the at least one rotatable disc element contacts the granular material between the crushing surface and the flange to remove the granular material.

14. The method according to claim 13, said method further comprises penetrating the granular material with the at least one rotatable disc element.

15. The method according to claim 13, said method further comprises loosening the granular material with the at least one rotatable disc element.

16. The method according to claim 13, said method further comprising providing a device of a second type on the roller crusher arranged downstream the device of the first type, and removing the granular material loosened by the device of the first type using the device of the second type.

17. The method according to claim 16, wherein said device of the second type comprises a scraper.

18. A refitting kit for a roller crusher having a first grinding roll and a second grinding roll, said first and second grinding rolls being arranged in parallel to each other and to define a crushing gap therebetween and drivable in a counter-rotating manner, wherein the refitting kit comprises a device of a first type for loosening granular material present between a crushing surface and a flange attached to at least one of the first and the second end of at least one of the two grinding rolls, wherein the device comprises at least one rotatable disc element spaced from and adjacent to the contact surface and positioned to contact only the granular material present on the grinding roll between the crushing surface and the flange such that the at least one rotatable disc element maintains a thickness of the granular material on the crushing surface of the grinding roll.

* * * * *